United States Patent
Koethe et al.

[11] Patent Number: 5,558,303
[45] Date of Patent: Sep. 24, 1996

[54] METHOD AND APPARATUS FOR USING HOT FUELS TO DE-ICE AIRCRAFT

[76] Inventors: Terence L. Koethe, 1021 Oakwood Dr., Keller, Tex. 76248; Richard M. Wilson, Rte. 6, Box 918, Burleson, Tex. 76028; Gary L. Reid, 6213 Greenlee, Fort Worth, Tex. 76112

[21] Appl. No.: 364,301

[22] Filed: Dec. 27, 1994

[51] Int. Cl.⁶ .............................................. B64D 15/02
[52] U.S. Cl. ............................. 244/134 R; 244/134 B; 244/135 R; 137/339
[58] Field of Search ..................... 244/134 R, 134 B, 244/135 R, 135 A; 60/39.093, 39.281; 141/82, 231; 137/79, 234.6, 339, 336

[56] References Cited

U.S. PATENT DOCUMENTS

| | | | |
|---|---|---|---|
| 2,507,643 | 5/1950 | Oaks | 244/134 R |
| 2,558,493 | 6/1951 | Melot | 60/39.093 |
| 3,627,239 | 12/1971 | Hull | 60/39.281 |
| 3,749,336 | 7/1973 | Christensen et al. | |
| 3,981,466 | 9/1976 | Shah | |
| 4,041,697 | 8/1977 | Coffinberry et al. | 60/39.093 |
| 4,976,397 | 12/1990 | Rudolph et al. | |

FOREIGN PATENT DOCUMENTS 527049  10/1940   United Kingdom ............... 244/134 B

*Primary Examiner*—Galen L. Barefoot
*Attorney, Agent, or Firm*—James E. Bradley

[57] ABSTRACT

A method and apparatus are provided for de-icing an aircraft of the type having wings and fuel storage in the wings. Hot fuel is provided for fueling the aircraft. The hot fuel is at elevated temperatures which are sufficiently high enough to transfer heat from the fuel, through a fuel tank extending within the wings, and to the exterior of the wings to de-ice the aircraft. A storage tank stores the fuel, and a heater heats the fuel to elevated temperatures. An intermediate thermal transfer system having a secondary thermal fluid transfers heat from a primary power source to the fuel. Further, a substantial volume of the secondary thermal fuel may be maintained at elevated temperatures to provide a sufficient thermal reserve capacity for heating the fuel upon demand.

20 Claims, 4 Drawing Sheets

5,558,303

METHOD AND APPARATUS FOR USING HOT FUELS TO DE-ICE AIRCRAFT

BACKGROUND OF THE INVENTION

1. Field of the Invention

The present invention relates to de-icing aircraft, and in particular to a method and apparatus for preventing the formation of and removal of ice from the wings of aircraft.

2. Description of the Prior Art

Icing occurs both during flight and when the aircraft are on the ground. Icing of aircraft on the ground occurs both in cooler and in warmer weather. In cooler weather, such as in blizzard conditions, atmospheric moisture accumulates and freezes on aircraft wings. Icing occurs in warm weather after aircraft have been in flight and then land. Ambient temperatures at the high altitudes at which aircraft fly are much cooler than temperatures of ambient air close to the ground. During flight, the components of aircraft wings will cool to the high altitude ambient temperatures. Then, after the aircraft lands, the components of aircraft wings still remain at lower temperatures for significant periods of time. Moisture from warm air close to the ground condenses and then freezes on the portions of the aircraft wings which remain at the cooler temperatures.

It should be noted that as used herein, the term icing aircraft refers to the various types of above-referenced icing phenomena. Further, the term de-icing refers to various apparatus and methods for both removing frozen moisture and preventing the accumulation of frozen moisture on aircraft wings. Thus, as used herein, the scope of the term de-icing includes anti-icing, as well as preventing moisture condensation within aircraft components, such as fuel tanks.

Icing on aircraft wings causes several problems. First, accumulation of ice on the wings of aircraft adds additional weight to the aircraft. This increases the amount of lift required for aircraft to fly. Another problem with ice buildup on aircraft wings is that the airfoil shape for the wings is disrupted. This reduces the amount of lift provided by the wings. Further, a condition related to icing results in moisture condensing on interior components of the wings, such as within fuel tanks. This also poses significant problems.

The primary method for de-icing aircraft on the ground is to spray the aircraft with de-icer fluids. Warm de-icer fluids are sprayed on aircraft components to melt frozen moisture. The temperatures of the aircraft wings are raised to warmer temperatures to prevent moisture condensation. However, the use of de-icer fluids is costly, and poses serious environmental concerns relating to pollution.

Several other prior art systems have been suggested for de-icing aircraft on the ground. One is to blow hot air across the cold wings of aircraft. However, this requires expensive blower systems and large capacity heaters to heat the air. Further, fuel for aircraft is easily ignited, and the use of large capacity heat sources close to aircraft creates serious safety concerns. Another prior art system is to use electric heaters to warm aircraft components. However, electric heating systems are not desirable due to the large power capacity required, and the additional weight such equipment will add to aircraft.

Several prior art means are provided for de-icing aircraft in flight, but they do not operate effectively after the aircraft lands. One in flight de-icing means used with jet aircraft is to pass a portion of hot exhaust gases from an engine discharge through interior portions of aircraft wings. Other prior art, in flight, de-icing means incorporate closed loop liquid circulating systems. One such closed loop liquid circulating system removes heat from the hot exhaust gases of a jet engine discharge, and then distributes the heat to cooler portions of aircraft. Another transfers heat from engine lubricants to cooler portions of aircraft. However, closed loop types of liquid circulating systems typically include components such as heat exchangers and piping which add additional weight to the aircraft, and which are subject to fluid leaks.

In flight types of de-icing systems typically require that the aircraft engine be operating at in-flight levels, and, as a result, they do not operate either efficiently or effectively on the ground. Prior art de-icing methods which are effective for use on the ground are rather costly, and pose safety and environmental concerns.

SUMMARY OF THE INVENTION

A method and apparatus are provided for de-icing an aircraft of the type having wings and fuel storage in the wings. Hot fuel is provided for fueling the aircraft. The hot fuel is at elevated temperatures which are sufficiently high enough to transfer heat from the fuel, through a fuel tank extending within the wings, and to the exterior of the wings to de-ice the aircraft. A storage tank stores the fuel, and a heater heats the fuel to elevated temperatures. An intermediate thermal transfer system having a secondary thermal fluid transfers heat from a primary power source to the fuel. Further, a substantial volume of the secondary thermal fuel may be maintained at elevated temperatures to provide a sufficient thermal reserve capacity for heating the fuel upon demand.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of illustrative embodiments when read in conjunction with the accompanying drawings, wherein:

DETAILED DESCRIPTION OF THE PREFERRED EMBODIMENT

Figure 1:
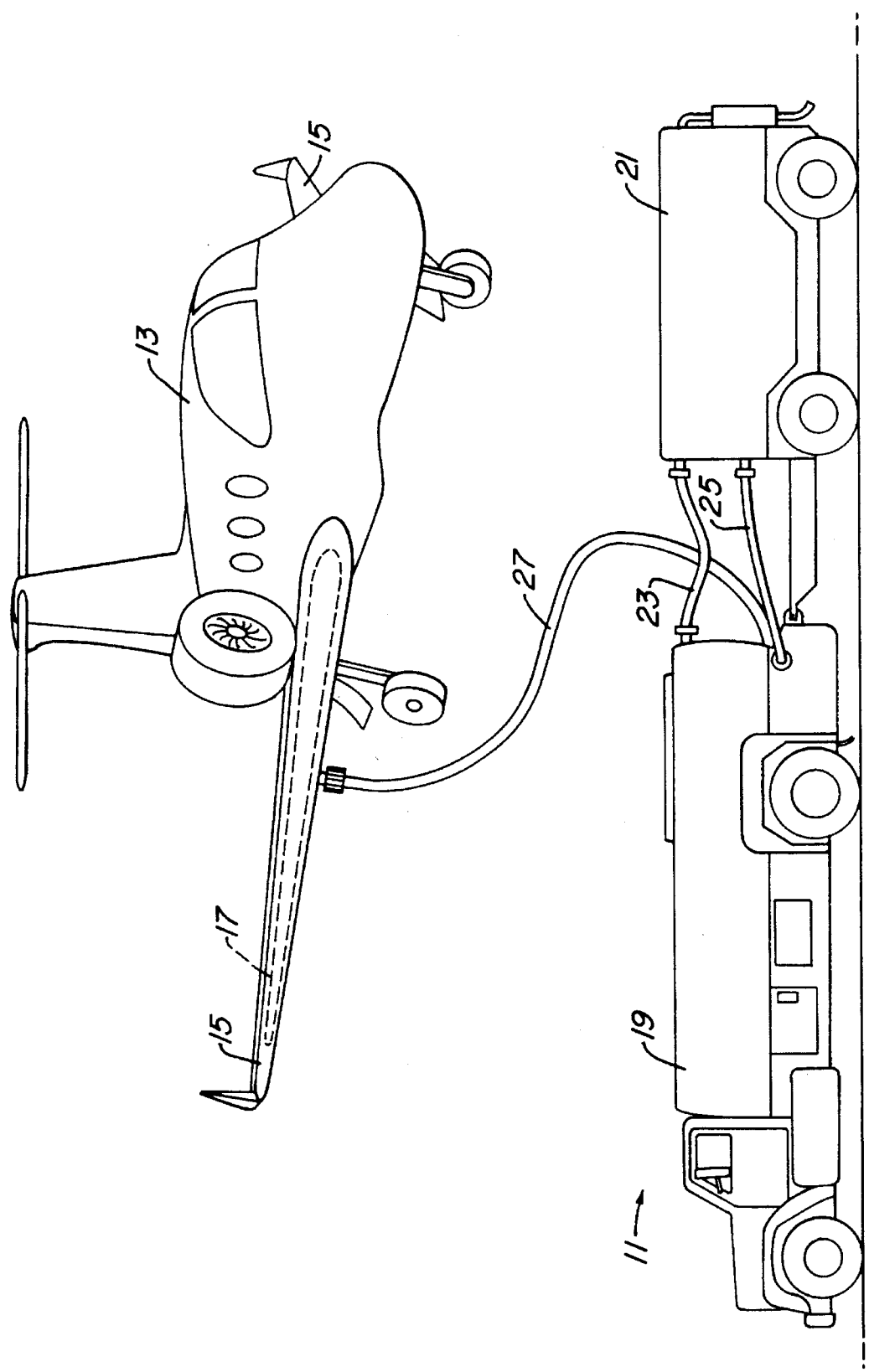
FIG. 1 is perspective view illustrating a preferred embodiment for hot fuel delivery system for de-icing aircraft according to the present invention.

FIG. 1 is perspective view illustrating hot fuel delivery system 11 for de-icing aircraft 13 according to the present invention. Aircraft 13 is of the type of aircraft having wings 15 within which are disposed fuel storage 17 provided by tanks which extend into each of wings 15. Hot fuel delivery system 11 includes tank truck 19 and mobile unit 21. Tank truck 19 preferably has an insulated fuel storage tank. Mobil unit 21 is a diesel powered heating unit according to the present invention. Flow lines 23, 25 connect between tank truck 19 and mobile unit 21 for circulating fluid between mobile unit 21 and tank truck 19 to heat the fuel within tank truck 19. Fueling flow line 27 extends from tank truck 19 to aircraft 13 for fueling aircraft 13 with hot fuel from delivery system 11.

Figure 2:
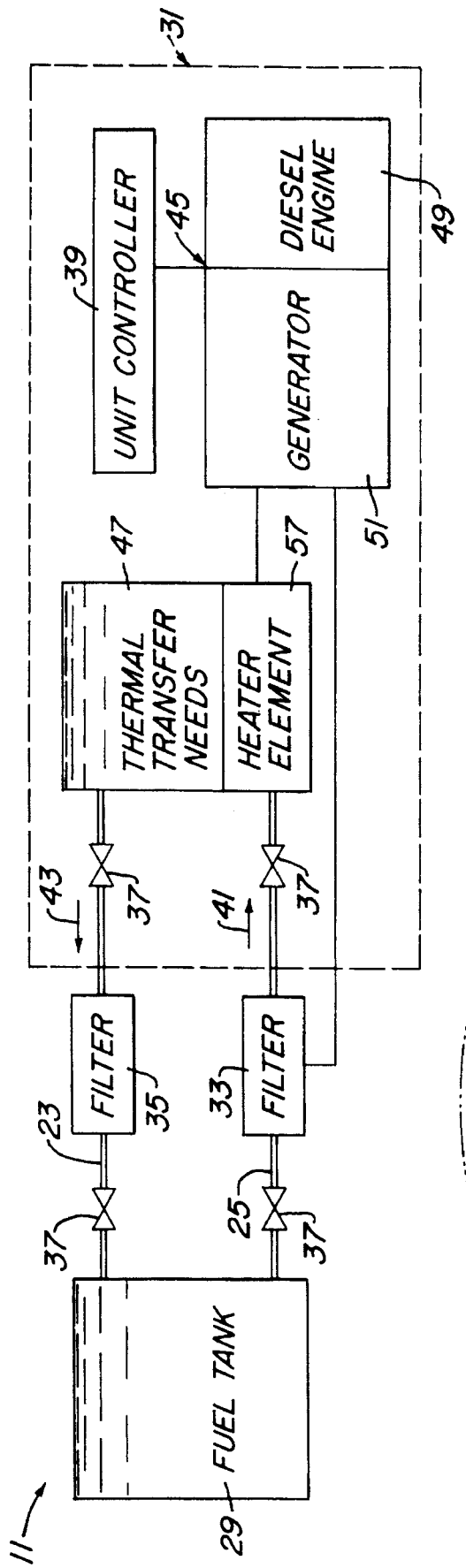
FIG. 2 is a schematic diagram depicting a hot fuel delivery system according to the present invention.

FIG. 2 is a schematic diagram depicting hot fuel delivery system 11. Fuel tank 29 is preferably insulated and is connected to heater unit 31 by flow lines 23, 25. Pump 33 is disposed within flow line 25 for circulating fluids between tank 29 and unit 31. Heating unit 31 is of the type which may be included within mobile unit 21. Filter 35 is provided in flow line 23 for filtering the fluids circulating between heater unit 31 and fuel tank 29. Fuel valves 37 are provided in flow lines 23, 25.

Pump 31 and valves 37 are controlled by unit controller 39. In this embodiment the present invention, fluid is circulated in direction 41 in flow line 25 and in direction 43 in flow line 23. It should be noted that fluid may be circulated in other directions in other embodiments the present invention. Further, in various embodiments of the present invention, the fluid transferred through flow lines 23, 25 may be either the fuel being heated, or an intermediate thermal transfer medium such as a thermal transfer liquid.

Primary power unit 45 is connected to thermal transfer means 47, which are both included within heater unit 31. In this embodiment the present invention, primary power unit 45 includes diesel engine 49 and electric generator 51. Diesel engine 49 and generator 51 provide electricity for powering heater element 57 in thermal transfer means 47. It should be noted that as used herein, a primary power source includes those which generate heat by burning fossil fuels, those which generate heat from an electrical power source, and those which generate heat by other means.

Figure 3:
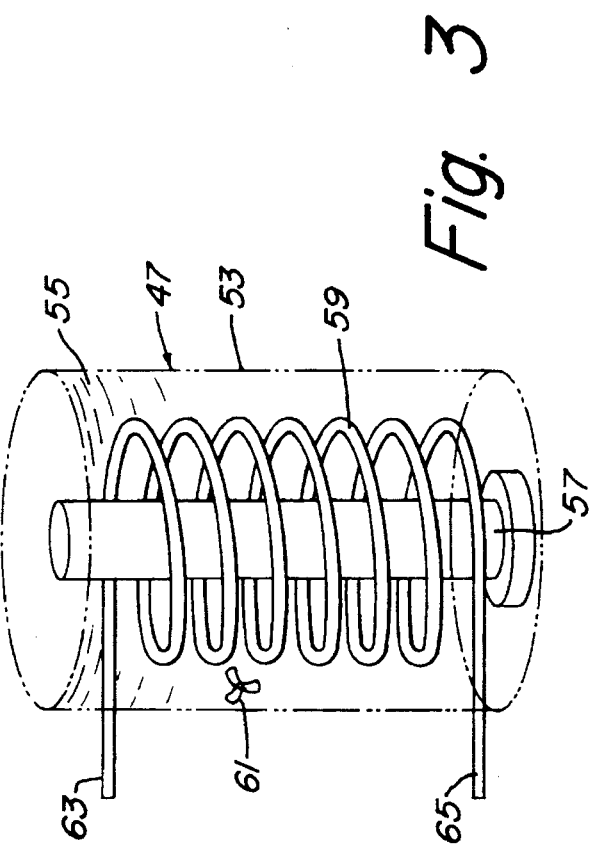
FIG. 3 is a schematic diagram of a thermal transfer means for heating fuel according to the present invention.

FIG. 3 depicts a schematic diagram of a thermal transfer means according to the present invention, such as may be used in thermal transfer means 47 (shown in FIG. 2). Thermal transfer means 47 includes storage tank 53, within which a secondary thermal fluid 55 is interiorly disposed. Storage tank 53 is preferably insulated. Secondary thermal fluid 55 is preferably a thermal oil. Heater element 57 and heat exchanger 59 are disposed within storage tank 52, immersed within thermal fluid 55. Heat exchanger 59 is wrapped exteriorly around heater element 57. Circulation unit 61 is provided for circulating the secondary thermal fluid 55 within storage tank 53 for uniformly distributing the heat therein.

Fuel connections 63, 65 are provided by the tubing from which heat exchanger 59 is formed. In this preferred embodiment the present invention, fuel is transferred through flow connection 65, through heat exchanger 59, and exits from within storage tank 53 through flow connection 63. Heat is stored within secondary thermal fluid 55 by continuously operating heater element 57 to heat thermal fluid 55 up to high temperatures, such as above 200 degrees Fahrenheit. Typically, the temperature of thermal fluid 55 will be continuously maintained at the high temperatures. Then when fuel is demanded, the fuel is circulated through thermal transfer means 47 and heat is transferred to the fuel by virtue of a temperature difference between the fuel and thermal fluid 55. The secondary thermal fluid provides a thermal capacity so that the primary power heating units may be rated at lower, less costly and less expensive to operate sizes over what would be required to heat the fuel from ambient temperatures upon demand.

Referring to FIG. 1, in operation, fuel will be loaded into tank truck 19 at ambient temperatures, such as those commonly encountered on the ground. Such ambient temperatures are inclusive of temperatures encountered with both in-ground and above-ground types of storage tanks. Mobile unit 21 is typically continuously operated to elevate the temperature of thermal fluid 55 to high temperatures, such as 200° Fahrenheit. The fuel within tank truck 19 is circulated through flow line 25 and into mobile unit 21, and then back through flow line 23 and into tank truck 19. Circulation is continued until the fuel within tank truck 19 is heated to the elevated temperatures, such as 130 degrees Fahrenheit. Fuel is then transferred through flow line 27 into tank 17 of aircraft 13.

The temperature of the hot fuel within tank 17 will be elevated above the temperatures of the surface, or outer periphery of wings 15. By virtue of this temperature difference, heat will transfer from tank 17 to the exterior of wing 15, melting any frozen moisture which is accumulated upon wing 15. It should be noted that the liquid fuel has the capacity to contain large amounts of heat. It is expected that hot fuel having temperatures not substantially less than 130 degrees Fahrenheit should be sufficiently hot enough to maintain wings 15 in a de-iced condition for several hours during blizzard conditions.

Referring to FIGS. 1 through 3, fuel is transferred from tank 29, through flow line 25 and into storage tank 53. The fuel then passes through heat exchanger 59 and absorbs heat from secondary thermal fluid 55. The fuel is circulated through heat exchanger 59 and absorbs heat from secondary thermal fluid 55 until the fuel is heated to an elevated temperature of not substantially less than 130 degrees Fahrenheit. The hot fuel is then transferred into storage 17 on aircraft 12. The hot fuel will then heat wings 15 to prevent moisture condensation and freezing.

In other embodiments of the present invention, fueling flow line 27 and flow line 23 may be directly connected for heating the fuel in a single pass through mobile unit 21. Fuel would then flow from tank truck 19, through flow line 25 and mobile unit 21, and then directly to tank 17 of aircraft 13. This would of course require higher capacity heating units to be within mobile unit 21. Further, mobile unit 21 could directly heat the fuel without having an intermediate thermal transfer fluid. Additionally, other embodiments of the present invention could incorporate, or mount, the components of mobile unit 21 directly onto a tank truck.

It should also be noted that, according to the present invention, mobile unit 21 may be connected to aircraft 13 for maintaining and heating the fuel within tank 17. Aircrafts typically have at least two to three fuel tanks which are interconnected so that fuel will transfer between the tanks. Each of the tanks typically has its own fueling port. Flow lines 23, 25 of mobile unit 21 could be separately connected to different fueling ports corresponding to two of the different fuel tanks in aircraft 13 for circulating fuel from within aircraft 13, through mobile unit 21 for heating to elevated temperatures, and then back into fuel tanks, such as fuel tank 17, of aircraft 15. Thus, fuel could be removed from aircraft 13, passed through mobile unit 21, and then transferred back into aircraft 13 to fuel the aircraft with fuel at the elevated temperatures. Mobile unit 21 is operable for both maintaining the temperature of hot fuels if aircraft 13 must remain on the ground for extended periods of time, and for heating fuel within tank 17 to elevated temperatures.

Figure 4:
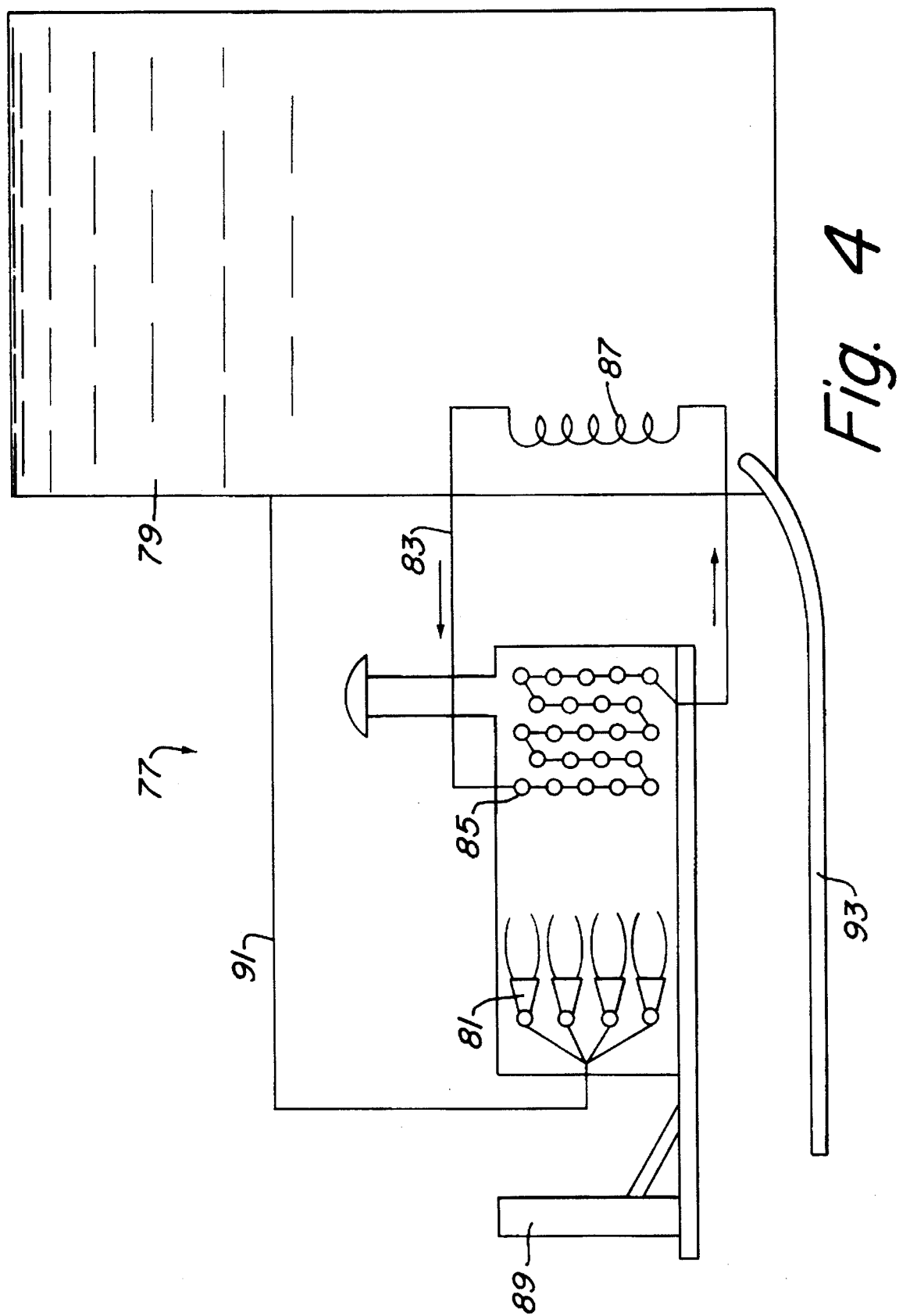
FIG. 4 depicts an alternative, large capacity hot fuel delivery system according to the present invention.

FIG. 4 depicts alternative hot fuel delivery system 77, which is made according to the present invention. Delivery system 77 is for accommodating large demands, and provides a much larger capacity fuel delivery system such as that which may be required for busy airports in larger metropolitan areas. Hot fuel delivery system 77 includes large capacity storage tank 79, such as a tank having a 500,000 gallon capacity. Fuel within tank 79 is heated to elevated temperatures, such as temperatures which are not substantially less than 130 degrees Fahrenheit.

Direct fired furnace 81 provides a primary heat source for heating fluids within closed loop circulating system 83. Closed loop circulating system 83 includes heat exchanger 85 and heat exchanger 87. Heat exchanger 85 is included within direct fired furnace 81 so that hot gases exiting direct fired furnace 81 will heat fluids within heat exchanger 85. Heat exchanger 87 is within storage tank 79 and receives hot secondary thermal fluids from heat exchanger 85 for passing therethrough to heat the fuel within storage tank 79. The thermal fluid exiting heat exchanger 87 then pass again through heat exchanger 85 for reheating within direct fired furnace 81. It should be noted that closed loop circulator 83 is depicted herein in a simplistic fashion, and some of the common elements that are well known in the art to provide in such circulating systems are omitted.

Controller 89 provides a means for controlling direct fired furnace 81 and closed loop circulating system 83. The fuel within tank 79 maybe circulated by a pump, or other type of circulation means, or heat may transfer within the fuel within tank 79 by combination of conduction and natural liquid convection. Flow line 93 extends from tank 79 for passing to a refueler truck, such as tank truck 19 (shown in FIG. 1). Fluids within tank 79 will preferably be maintained at an elevated temperature, such as 130 degrees Fahrenheit. It is also preferable that tank 79 and flow line 93 be insulated to reduce heat losses. A flow line 91 may be provided for using fuel from within tank 79 to operate furnace 81.

Figure 5:
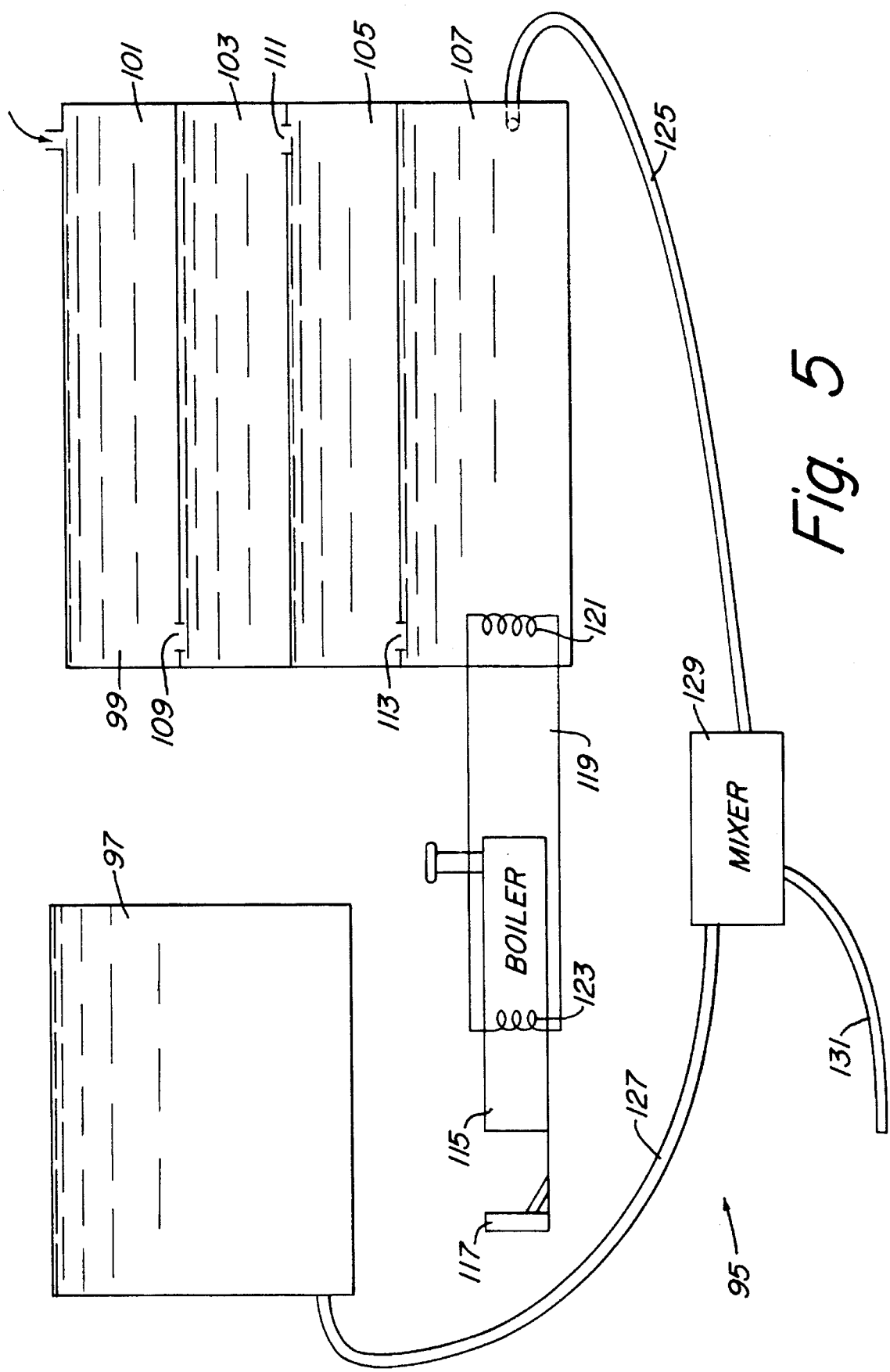
FIG. 5 a second alternative, large capacity hot fuel delivery system according to the present invention.

FIG. 5 depicts another alternative embodiment of the present invention, hot fuel delivery system 95. Hot fuel delivery system 95 is a large capacity delivery system such as may be used at larger, metropolitan airports where larger demands are encounter. Delivery system 95 includes primary storage tank 97 and secondary storage tank 99. Primary storage tank 97 is a large capacity storage tank, such as for containing 500,000 gallons of fuel. The fuel within primary storage tank 97 may be at ambient temperatures, such as 50 degrees Fahrenheit.

A secondary storage tank 99 is a compartmentalized tank, having compartments 101, 103, 105, and 107. Ports 109, 111, and 113 are provided for passing fuel from compartment 101 to compartment 103, from compartment 103 to compartment 105, and from compartment 105 to compartment 107, respectively. Furnace 115 is a direct fired furnace, such as furnace 81 (shown in FIG. 4). Control unit 117 is provided to control operation of furnace 115. Closed loop circulating system 119 extends from furnace 115 to heat exchanger 121 within compartment 107 of secondary storage tank 99. Secondary storage tank 99 may be a smaller capacity storage tank such as one having a capacity of 50,000 gallons. Closed loop circulating system 119 further includes heat exchanger 123 from which hot gases from furnace 115 transfer heat to the thermal fluid within closed loop circulating system 119.

Fuel at ambient temperatures will enter into secondary storage tank 99 in compartment 101. It should be noted that heat is transferred by closed loop circulating system 119 only to the fuel within storage compartment 107. The fuel therein will be heated to higher, elevated temperatures such as 300° Fahrenheit. The fuel within compartments 103 and 105 will be at lesser temperatures than the fuel within compartment 107, yet at greater temperatures than the fuel within compartment 101.

As fuel is passed from within compartment 107 to flow line 125, the fuel from the upper compartments will transfer downward. Thus, each of the four compartments will be operated at different temperatures, with the temperature decreasing in the higher compartments. For example, compartment 101 could be maintained from minus 30 to 50 degrees Fahrenheit. The temperature in storage tank 83 could be maintained at 134 degrees Fahrenheit. The temperature in compartment 105 could be maintained at 218 degrees Fahrenheit. Lastly, the temperature in compartment 107 could be maintained at 300 degrees Fahrenheit.

Upon demand for fuel, the fuel initially within compartment 107 transfers through flow line 125 and the fuel from large capacity storage tank 97 transfers through flow line 127. Flow lines 125, 127 are connected to mixer 129 for mixing the cooler fuel from storage tank 97 with the ultra-hot fuel from compartment 107 of storage tank 99. Mixer 129 then passes the hot fuel to fuel line 131 for delivery to an aircraft, or preferably to an insulated tank truck for transport to an aircraft.

An example of the various temperatures and mixture ratios used for hot fuel delivery system 95 could be as follows. Hot fuel at 300 degrees Fahrenheit transfers through flow line 125 to mixer 129. Cooler fuel, such as at temperatures of 50 degrees Fahrenheit and less, also transfer to mixer 129. Mixer 129 then mixes the fuels at a 2 to 1 ratio, that is two parts of the cooler fuel from flow line 127 with one part of the ultra-hot fuel from flow line 125. The resulting mixture of fuels would then pass through flow line 131 and have a mixture temperature in the range of 130 degrees Fahrenheit.

Alternative hot fuel delivery system 95 provides a large capacity delivery system, yet requires heating equipment having a smaller rated heating capacity than would be required for instantaneously heating fuel upon demand. Rather than heating the entire 50,000 gallon tank 97, the smaller compartment 107 within a 50,000 gallon tank 99 is heated, and the temperature of the fluids are stratified within storage tank 99. By having the upper compartments at higher temperatures than ambient temperatures, they may be more quickly heated upon demand by lower capacity furnaces and heat exchangers than would be required to instantaneously meet the thermal demand for heating hot fuel directly from ambient temperatures to the elevated temperatures.

It should be noted that other embodiments of the present invention, may be provided which do not include a circling system for transferring heat by means of a secondary thermal transfer fluid. That is, fuel may be passed directly through a furnace or heating component of the present invention. However, such types of systems would have much greater risk that the fuel could be inadvertently ignited.

The present invention provides several advantages over prior art systems for de-icing aircraft on the ground. The aircraft will still have prior art in flight de-icing systems. A de-icing system according to the present invention may be utilized for de-icing aircraft on the ground, without requiring modification to the design of current aircraft. The amounts of de-icer fluids required for spraying cool aircraft components are greatly reduced when aircraft are de-iced using hot fuel. Thus, the costs and environmental concerns that arise with use of prior art de-icer fluids are avoided. Further, the problem of moisture condensation within aircraft components such as fuel tanks are avoided when aircraft are fueled with hot fuel.

Although the invention has been described with reference to specific embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or embodiments that fall within the true scope of the invention.

We claim:

1. A method for de-icing an aircraft of the type having wings and fuel storage in the wings, the method comprising in combination the steps of:

provding fuel for fueling the aircraft;

providing a primary heat source, exterior of the aircraft;

operating the primary heat source to heat the fuel to elevated temperatures, exterior of the aircraft, with the elevated temperatures being above ambient fuel temperatures of the type encountered on the ground and in in-ground fuel storage tanks;

fueling the aircraft with the fuel at the elevated temperatures; and wherein the elevated temperatures are sufficiently higher than the temperatures of outer portions of the wings such that heat transfers from the fuel within the wings to the outer portions of the wings for de-icing the wings.

2. The method according to claim 1, wherein the elevated temperatures of the fuel are not substantially less than 130 degrees fahrenheit.

3. The method according to claim 1, wherein the step of heating the fuel to elevated temperatures, which are above ambient temperatures on the ground and in in-ground storage tanks, comprises the steps of:

operating the primary heat source to heat a first portion of the fuel, exterior of the aircraft, to temperatures which are substantially greater than the elevated temperatures; and prior to passing fuel into the aircraft, mixing a first and second portions of the fuel to heat the second portion of the fuel to the elevated temperatures and provide a mixture of the first and second portions of the fuel which is not less than the elevated temperatures.

4. The method according to claim 1, wherein the steps of heating the fuel to the elevated temperatures and fueling the aircraft further comprise the steps of:

providing a tank truck for transferring fuel from a storage facility to the aircraft;

providing a mobile unit having a heat exchanger and including the primary heat source;

storing the fuel within the tank truck;

passing at least a portion of the fuel through the mobile unit to heat the fuel to the elevated temperatures, exterior of the aircraft; and transferring the fuel, at the elevated temperatures, from the tank truck and into the fuel storage within the wings of the aircraft.

5. The method according to claim 1, wherein the steps of providing fuel for the aircraft and heating the fuel to the elevated temperatures comprise the steps of:

providing a fuel storage tank having a heat exchanger disposed therein for passing a heat transfer fluid through the heat exchanger and the fuel storage tank;

connecting the primary heat source to the heat exchanger within the fuel storage tank for heating the heat transfer fluid and passing the heat transfer fluid through the heat exchanger to heat stored fuel within the fuel storage tank;

operating the primary heat source and transferring heat through the heat transfer fluid and the heat exchanger to the stored fuel within the fuel storage tank;

continuing to operate the primary heat source and transfer heat to the stored fuel to heat the stored fuel within the fuel storage tank to at least the elevated temperatures; and drawing at least a portion of the stored fuel from within the fuel storage tank to provide the fuel for fueling the aircraft.

6. The method according to claim 1, wherein the step of heating the fuel to the elevated temperatures comprises the steps of:

providing a heat exchanger and a secondary thermal fluid storage tank, exterior of the aircraft, having a secondary thermal fluid disposed therein;

connecting the primary heat source to the secondary thermal fluid storage tank for heating the secondary thermal fluid to high temperatures, which are substantially greater than the elevated temperatures;

operating the primary heat source and heating the secondary thermal fluid to the high temperatures; and passing one of the fuel and the secondary thermal fluid through the heat exchanger to heat the fuel to the elevated temperatures.

7. In an apparatus for de-icing an aircraft of the type having wings and fuel storage in the wings, the improvement comprising in combination:

ground storage means for storing the fuel;

heating means disposed exterior of the aircraft for heating fuel to elevated temperatures, which are above ambient fuel temperatures of the type encountered in above-ground and in-ground fuel storage tanks;

transfer means for transferring the fuel from the ground storage means, and into the fuel storage in the wings with the fuel having the elevated temperatures; and wherein the elevated temperatures are sufficiently high so that heat transfers from the fuel at the elevated temperatures within the fuel storage in the wings to cooler portions of the aircraft to heat the cooler portions of the aircraft.

8. The apparatus according to claim 7, wherein the heating means comprises:

a primary heat source for heating a thermal transfer fluid to high temperatures;

two fuel storage tanks for separately storing a first and second portions of the fuel;

a heat exchanger disposed for transferring heat from the thermal transfer fluid, at the high temperatures, to the first portion of the fuel and heating the first portion of the fuel to intermediate temperatures, which are below the high temperatures and above the elevated temperatures; and mixing means for mixing the first portion of the fuel at the intermediate temperatures and the second portion of the fuel to transfer heat from the first portion of the fuel to the second portion of the fuel and provide a mixture of the first and second portions of the fuel at the elevated temperatures.

9. The apparatus according to claim 7, wherein the heating means and the transfer means comprise:

a tank truck having a tank for storing the fuel therein and transferring the fuel from a storage facility to a position which is proximate to the aircraft for transferring the fuel to the fuel storage in the wings; and a mobile unit for pulling behind the tank truck, the mobile unit having a primary heat source and thermal transfer means which is connected to the tank truck for transferring heat from the primary heat source to the fuel within the tank truck to heat the fuel within the tank truck to the elevated temperatures.

10. The apparatus according to claim 7, wherein the ground storage means and the heating means comprise:

a fuel storage tank having a heat exchanger disposed therein; and a primary heat source connected to the heat exchanger within the fuel storage tank for heating a heat transfer fluid and passing the heat transfer fluid through the heat exchanger to heat stored fuel within the fuel storage tank to at least the elevated temperatures.

11. The apparatus according to claim 7, wherein the heating means comprises:

a secondary thermal fluid storage tank having a secondary thermal fluid disposed therein;

a primary heat source which is connected to the secondary thermal fluid storage tank for heating the secondary thermal fluid to high temperatures, which are substantially greater than the elevated temperature; and a heat exchanger disposed within the secondary thermal fluid storage tank for passing at least part of the fuel through the secondary thermal fluid storage tank for absorbing heat from the secondary thermal fluid to heat the fuel to the elevated temperatures.

12. The apparatus according to claim 7, wherein the heating means comprises:

a secondary thermal fluid storage tank having a secondary thermal fluid disposed therein;

a primary heat source which is connected to the secondary thermal fluid storage tank for heating the secondary thermal fluid to high temperatures, which are substantially greater than the elevated temperatures; and a heat exchanger disposed within the ground storage means for passing the secondary thermal fluid therethrough and heating at least part of the fuel to the elevated temperatures.

13. The apparatus according to claim 7, wherein the elevated temperatures are not substantially less than 130 degrees fahrenheit.

14. In an apparatus for de-icing an aircraft of the type having wings and fuel storage in the wings, the improvement comprising in combination:

a fuel tank, disposed exterior of the aircraft;

heating means disposed exterior of the aircraft for heating fuel to elevated temperatures, exterior of the aircraft, with the elevated temperatures being ambient fuel temperatures of the type encountered in above-ground and in-ground fuel storage tanks;

transfer means for transferring the fuel from the fuel tank and into the fuel storage in the wings with the fuel having the elevated temperatures; and wherein the elevated temperatures are sufficiently higher than outer peripheral portions of the wings so that heat transfers from the fuel, through the fuel storage within the wings, and to the outer peripheral portions of the wings for de-icing the wings.

15. The apparatus according to claim 14, wherein the heating means comprises:

a heat source for heating a thermal transfer fluid to high temperatures;

two fuel storage tanks for separately storing a first and second portions of the fuel;

a heat exchanger disposed for transferring heat from the thermal transfer fluid, at the high temperatures, to the first portion of the fuel and heating the first portion of the fuel to intermediate temperatures, which are below the first high temperatures and above the elevated temperatures; and mixing means for mixing the first portion of the fuel at the intermediate temperatures, and the second portion of the fuel to transfer heat from the first portion of the fuel to the second portion of the fuel and provide a mixture of the first and second portions of the fuel at the elevated temperatures.

16. The apparatus according to claim 14, wherein the heating means and the transfer means comprise:

a tank truck having a tank for storing the fuel therein and transferring the fuel from a storage facility to a position which is proximate to the aircraft for transferring the fuel to the fuel storage in the wings; and a mobile unit for pulling behind the tank truck, the mobile unit having a primary heat source and thermal transfer means which is connected to the tank truck for transferring heat from the primary heat source to the fuel within the tank truck to heat the fuel within the tank truck to the elevated temperatures.

17. The apparatus according to claim 14, wherein the ground storage means and the heating means comprise:

the fuel tank having a heat exchanger disposed therein; and a heat source connected to the heat exchanger within the fuel tank for heating a heat transfer fluid and passing the heat transfer fluid through the heat exchanger to heat stored fuel within the fuel tank to at least the elevated temperatures.

18. The apparatus according to claim 14, wherein the heating means comprises:

a secondary thermal fluid storage tank having a secondary thermal fluid disposed therein;

a primary heat source which is connected to the secondary thermal fluid storage tank for heating the secondary thermal fluid to high temperatures, which are substantially greater than the elevated temperatures; and a heat exchanger disposed within the secondary thermal fluid storage tank for passing at least part of the fuel through the secondary thermal fluid storage tank for absorbing heat from the secondary thermal fluid and heating the fuel to the elevated temperatures.

19. The apparatus according to claim 14, wherein the heating means comprises:

a secondary thermal fluid storage tank having a secondary thermal fluid disposed therein;

a primary heat source which is connected to the secondary thermal fluid storage tank for heating the secondary thermal fluid to high temperatures, which are substantially greater than the elevated temperatures; and a heat exchanger disposed within the fuel tank for passing the secondary thermal fluid therethrough and heating at least part of the fuel to the elevated temperature.

20. The apparatus according to claim 14, wherein the elevated temperatures are not substantially less than 130 degrees fahrenheit.

* * * * *